United States Patent [19]

Wilson et al.

[11] Patent Number: 4,820,058
[45] Date of Patent: Apr. 11, 1989

[54] CONTROL ROD END PLUG WITH A STABILIZING CONFIGURATION

[75] Inventors: John F. Wilson, Murrysville Boro; Samuel Cerni, Churchill Boro; Robert K. Gjertsen, Monroeville, all of Pa.

[73] Assignee: Westinghouse Electric Corp., Pittsburgh, Pa.

[21] Appl. No.: 634,729

[22] Filed: Jul. 26, 1984

[51] Int. Cl.$^4$ .............................................. G21C 7/10
[52] U.S. Cl. .................................... 376/327; 376/277
[58] Field of Search ............... 376/225, 226, 327, 335, 376/353, 377, 389, 399, 439, 443, 447, 449, 451, 452, 277

[56] References Cited

U.S. PATENT DOCUMENTS

| | | | |
|---|---|---|---|
| 3,285,820 | 11/1966 | Tollet et al. | 376/327 |
| 3,728,218 | 4/1973 | Gnutzmann et al. | 376/226 |
| 3,979,258 | 9/1976 | Schweiger et al. | 376/327 |
| 4,292,132 | 9/1981 | Schukei et al. | 376/327 |
| 4,311,560 | 1/1982 | Verdone | 376/225 |
| 4,313,796 | 2/1982 | Buettiker | 376/353 |

FOREIGN PATENT DOCUMENTS 2066109   4/1982   Fed. Rep. of Germany .

Primary Examiner—Deborah L. Kyle
Assistant Examiner—Richard L. Klein

[57] ABSTRACT

A nuclear reactor includes a plurality of upstanding guide thimbles and a plurality of control rods received in the guide thimbles and supported for movement relative to the thimbles between inserted and withdrawn positions. The control rods each include a tubular cladding member and an end plug attached to a lower end of the member. The improvement relates to the end plug having a stabilizing configuration which reduces lateral vibratory motion and contact between the control rod and its respective guide thimble. The end plug has an asymmetrical shape which places its terminal tip end in a position offset to one side of the central axis of the control rod and its end plug. As a result of interaction of the asymmetrical plug tip with coolant flowing along the control rod, a lateral steady-state force is imparted to the end plug which maintains the control rod end plug pressed against the wall of tis respective guide thimble. Several different asymmetrical configurations can be employed on the end plug.

5 Claims, 4 Drawing Sheets

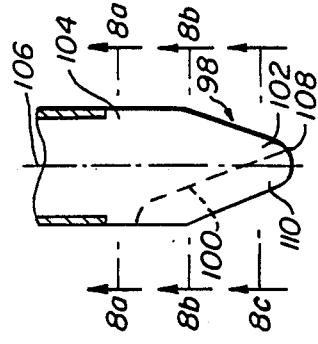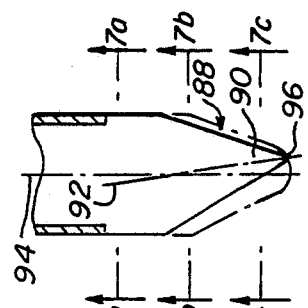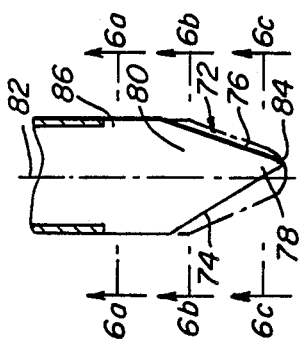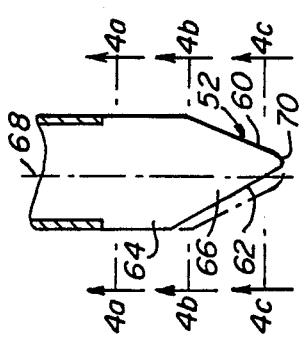

CONTROL ROD END PLUG WITH A STABILIZING CONFIGURATION

CROSS REFERENCE TO RELATED APPLICATION

Reference is hereby made to the following co-pending U.S. patent application dealing with subject matter related to the present invention: "Wear Sleeve for a Control Rod End Plug" by S. Cerni et al, U.S. Ser. No. 634,725, filed July 26, 1984.

BACKGROUND OF THE INVENTION

1. Field of the Invention

The present invention relates generally to nuclear reactors having rods, such as of the control or water displacer type, reciprocable into and out of a reactor core and, more particularly, is concerned with a control rod end plug having an asymmetrical configuration which causes coolant axially flowing along the control rod to impart a lateral stabilizing force against the control rod which presses the control rod at its end plug against the wall of a guide thimble within which the rod reciprocably moves and thereby prevent lateral vibration of the rod.

2. Description of the Prior Art

In a typical nuclear reactor, the reactor core is composed of a plurality of elongated fuel assemblies each of which contains a plurality of elongated fuel elements or rods. A liquid coolant is pumped upwardly through the core in order to extract heat generated in the core for the production of useful work. The heat output of the core is usually regulated by the movement of control rods containing neutron absorbing material such as $B_4C$ or by movement of water displacer rods such as those described in U.S. Pat. No. 4,432,934. In reactors of the pressurized-water type, each fuel assembly typically includes a plurality of cylindrical guide tubes or thimbles through which the cylindrical control rods or water displacer rods are reciprocably moved. Some of the coolant flow is usually diverted into the lower end of the guide thimble in order to cool the control rod. The control rod ordinarily generates heat in the nuclear transformation associated with its neutron absorbing function.

During power operation of the reactor, most of the regulating control rods are maintained substantially withdrawn from the reactor core and thus disposed in withdrawn positions in which the lower end plug tips of the control rods are within the upper ends of the guide thimbles. While in such withdrawn positions, the control rods may experience significant vibration induced by coolant water flow within the guide thimbles which results in oscillatory contact of the rod end plug tips against the internal wall surfaces of the guide thimbles and wear on these surfaces. Continuous wear of the guide thimble walls can lead to perforation of the thimbles and significant weakening of the fuel assembly structure.

Thus, there has arisen the need to significantly mitigate the affects of the control rod vibrations so as to bring guide thimble wear under control. Two approaches to solving this problem are disclosed in U.S. Patents to Schukei et al (U.S. Pat. No. 4,292,132) and Verdone (U.S. Pat. No. 4,311,560). Both of these approaches have as a common objective the elimination of wear on the guide thimble wall by preventing vibratory contact of the control rod against its adjacent guide thimble wall. In the Verdone approach, a spring device is added to the lower end of the control rod which provides a uniform, resilient interference fit against the guide thimble wall and thereby prevents the rod tip from impacting the guide thimble wall. In the Schukei et al approach, the control rod has a hydraulic bearing formed at its lower tip which produces forces which counteract forces tending to drive the control rod tip against the guide thimble wall. In such manner, contact of the control rod against the guide thimble wall and resultant wear thereon are substantially avoided.

While the approaches taken in these two patents operate reasonably well and achieve their objectives under the range of operating conditions for which they were designed, a need exists for an alternative approach to the wear problem which is simpler and less costly in its design and construction and is more reliable in its performance over the long term.

SUMMARY OF THE INVENTION

The present invention provides an asymmetrical configuration on the lower end plug of the control rod designed to satisfy the aforementioned needs. Unlike the prior art approaches which prevent vibratory contact with the guide thimble wall by interposing some added device which either maintains continuous contact with the wall or prevents any contact at all from occurring, the present invention merely reshapes one of the basic parts of the control rod; its end plug. Underlying the present invention is the recognition that one of the causes of coolant flow-induced vibration is vortex shedding around the tip of the end plug of the prior design. The prior end plug design, which has a symmetrical configuration about the axial centerline of the control rod, is typical of geometries which tend to promote vortex shedding and flow-induced vibration. By using an asymmetric configuration at the end plug tip, vortex shedding type of flow-induced vibration is greatly reduced.

Furthermore, the present invention recognizes that lateral vibration of the control rod due to axial flow of coolant can be prevented by imposing a small, steady-state lateral force on the rod. This force can be produced by the same asymmetrical configuration which reduces vortex shedding. Such end plug shape causes non-symmetric flow velocities around the end plug tip. The magnitude of the lateral force is a function of the coolant axial flow rate and the shape of the end plug tip. Several end plug configurations will achieve these desired results of reduction of vortex shedding type of flow-induced vibration and creation of a lateral, steady-state force on the control rod.

Accordingly, the present invention sets forth in a nuclear reactor including a plurality of upstanding guide thimbles, a plurality of control rods received in the guide thimbles and means supporting the control rods for movement relative to the thimbles between inserted and withdrawn positions, an end plug having an asymmetrical configuration attached to an end of each control rod which produces, in response to axial flow of coolant along the control rod and within its respective guide thimble, a lateral steady-state force on the control rod which presses the control rod end plug against a wall of the guide thimble so as to substantially prevent lateral vibration of the control rod due to the axial flow of coolant. Several different asymmetrical designs can be used to achieve non-symmetrical flow velocities around the tip of the end plug which produce the lateral force. In one design, a flat is formed, such as by machining, on one side of an otherwise axially symmetrical tapered outer surface of the end plug. Other designs have either a concave surface formed on one side of the tapered outer surface of the end plug, a tapered configuration which is offset to one side of the axis of the control rod, or a pair of flats on opposite sides of the tapered outer surface which form different angles with the axis of the control rod.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 4 is an enlarged, fragmentary view of an end of the control rod containing an end plug with one of the stabilizing designs of the present invention as taken along line 4—4 of FIG. 3.

FIGS. 4a to 4c are sectional views taken along lines 4a—4a, 4b—4b and 4c—4c in FIG. 4.

FIGS. 6 to 8 are enlarged, fragmentary views of an end of the control rod containing an end plug with alternative forms of the stabilizing designs of the present invention.

FIGS. 6a to 6c, 7a to 7b and 8a to 8c are sectional views taken along correspondingly designated lines in FIGS. 6 to 8.

DETAILED DESCRIPTION OF THE PREFERRED EMBODIMENT

Figure 1:
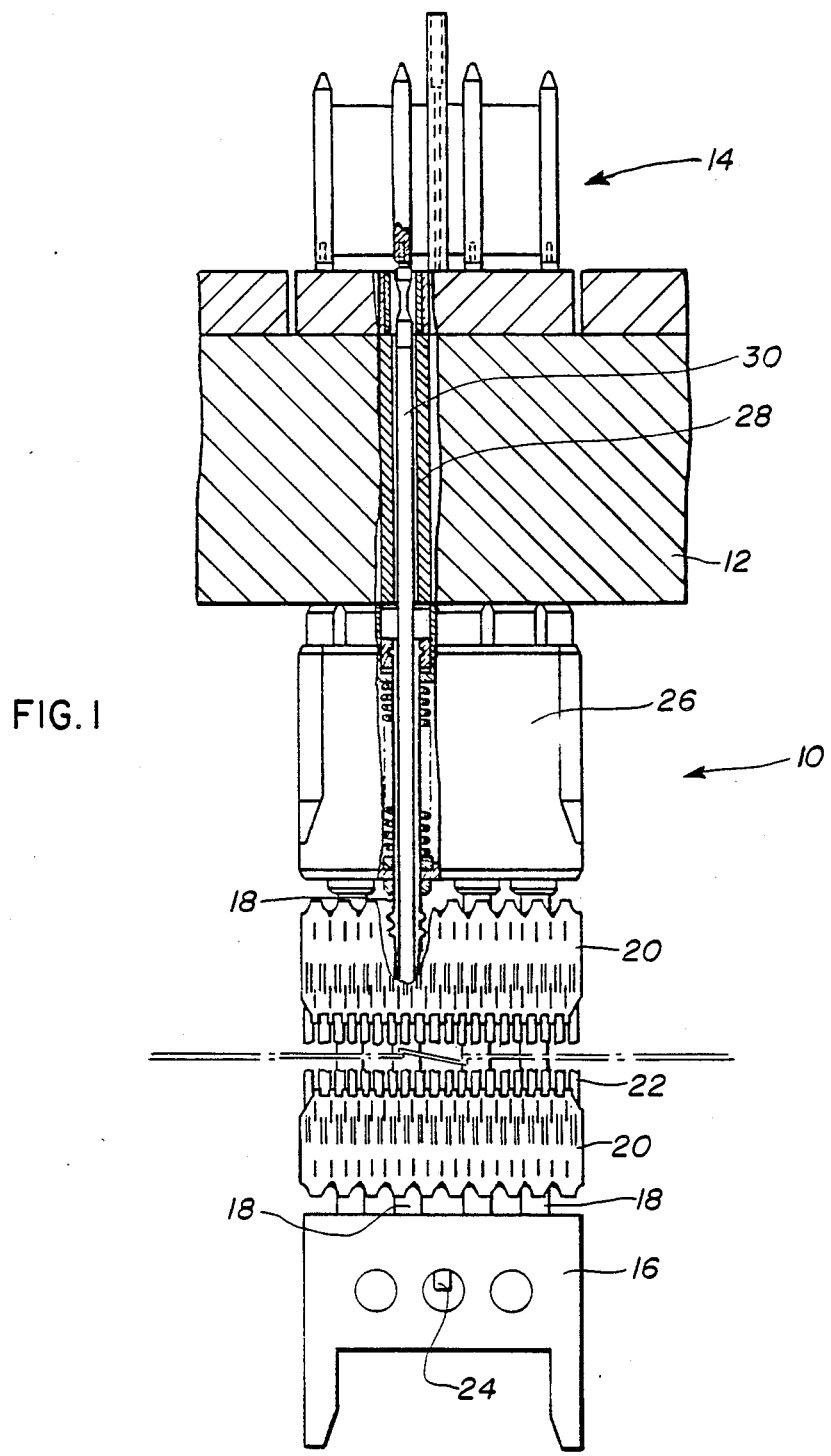
FIG. 1 is an elevational view of a fuel assembly with control rods supported so as to extend down into guide thimbles of the assembly, the latter being illustrated in vertically foreshortened form with parts broken away for clarity.

In the following description, like reference characters designate like or corresponding parts throughout the several views of the drawings. Also, in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an overall combination of a fuel assembly, generally designated by the numeral 10, an upper core support plate 12 disposed above and extending across the top of fuel assembly 10, and a spider assembly 14 disposed above the upper core support plate. Each of these components will be described and discussed separately.

The fuel assembly 10, being shown in a vertically foreshortened form in FIG. 1, basically includes a lower end structure or bottom nozzle 16 for supporting the assembly on a lower core plate (not shown) in the core region of a reactor (not shown), and a number of longitudinally extending guide tubes or thimbles 18 which project upwardly from the bottom nozzle 16. The assembly 10 further includes a plurality of transverse grids 20 axially spaced along the guide thimbles 18 and an organized array of elongated fuel rods 22 transversely spaced and supported by the grids 20. Finally, the assembly 10 has an instrumentation tube 24 located in the center thereof and an upper end structure or top nozzle 26 attached to the upper ends of the guide thimbles 18. With such arrangement of parts, the fuel assembly 10 forms an integral unit capable of being conventionally handled without damaging the assembly parts. Since the fuel assembly 10 does not form a part of the present invention and is merely for illustrational purposes, any further description thereof is unnecessary and thus will not be given. For a more detailed description of the fuel assembly 10, reference should be made to the pending patent application of Robert K. Gjertsen et al, entitled "Nuclear Reactor Fuel Assembly with Improved Top Nozzle and Hold Down Means"; filed Oct. 17, 1983; and assigned U.S. Ser. No. 542,625.

The upper core support plate 12, being conventional, extends across the top of the fuel assembly 10 as well as across the top of other identical fuel assemblies (not shown) arranged within the core. For the sake of brevity, it should suffice to say that the core plate 12 has a multiplicity of flow openings 28 (only one of which is seen in FIG. 1) to allow coolant to pass upwardly through the core, and that at least some of these openings are aligned over the guide thimbles 18 such that control rods 30 can pass down through the core plate 12 and be inserted into the guide thimbles 18 of the fuel assembly 10.

Connected to the upper ends of the control rods 30 is the spider assembly 14 which supports the rods for vertical movement within the guide thimbles 18 by a conventional drive mechanism (not shown). In the illustrated embodiment, the spider assembly 14 is disposed above the core plate 12 and is restably supported thereon when the control rods 30 are fully inserted in the guide thimbles 18 as seen in FIG. 1. In other arrangements, the spider assembly is located between the bottom of the upper core plate and the top of the fuel assembly.

Figure 2:
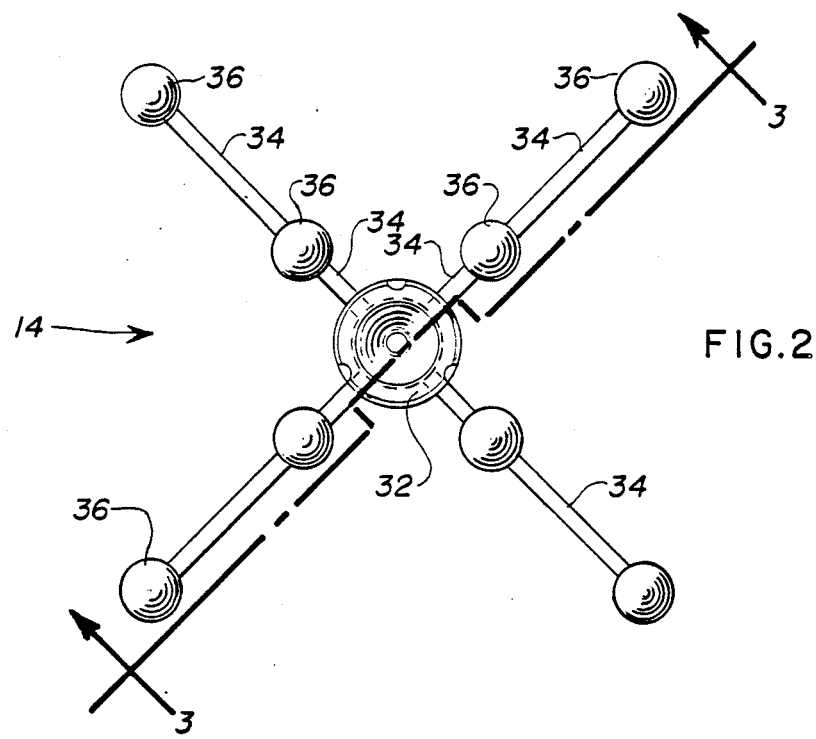
FIG. 2 is an enlarged, top plan view of a spider assembly which includes the control rods.
Figure 3:
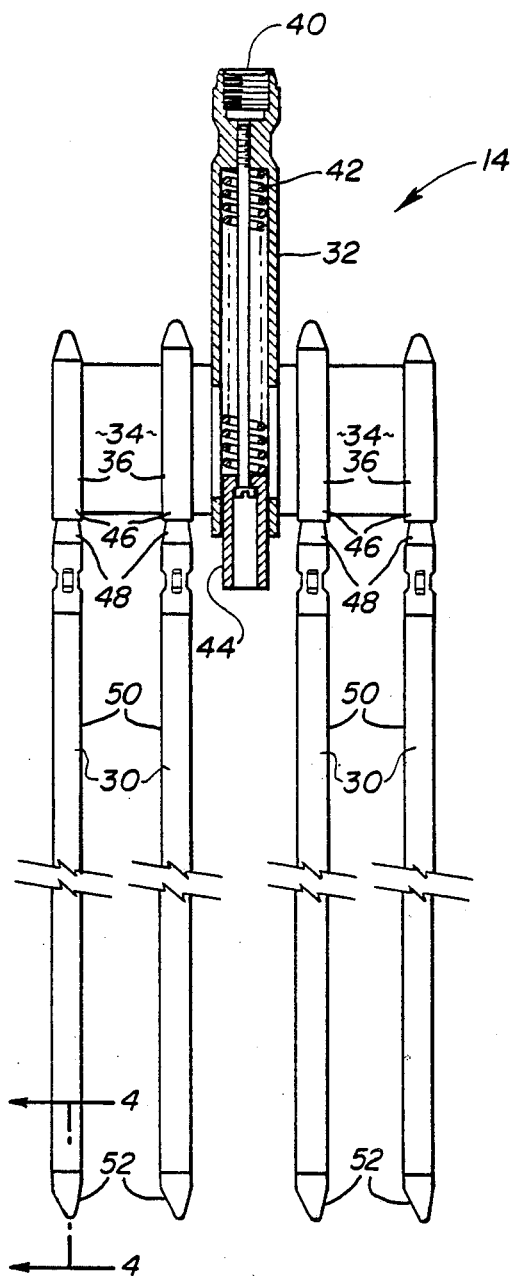
FIG. 3 is a sectional view of the spider assembly as taken along line 3—3 of FIG. 2.

As best seen in FIGS. 2 and 3, the spider assembly 14 basically includes a central hub 32, a plurality of vanes 34 radially extending outwardly from the hub 32, and a plurality of fingers 36 associated with the vanes 34 for connection with the upper ends of the control rods 30. The central hub 32 is preferably in the form of an elongated cylindrical tube having on its upper end an internally threaded segment 40 for connection with the drive mechanism (not shown) which vertically raises and lowers the spider assembly 14 and the control rods 30 therewith in a conventional manner. The tubular hub 32 houses a common load absorbing mechanism which includes a coil spring 42 held in a state of compression and a nipple 44 which seats in a shallow cavity (not shown) provided in the top surface of the core plate 12 to assist in proper alignment of the control rods 30 within the core plate openings 28 and the guide thimbles 18. As is well known, the primary purpose of such a load absorbing mechanism is to prevent shock loading of the core plate 12, as well as the fuel assembly 10, as the spider assembly 14 abuts the top of the core plate 12 when the control rods 30 are fully inserted in the guide thimbles 18.

As seen in FIG. 3, each control rod 30 is supported by one of the elongated fingers 36 of the spider assembly 14. The lower end 46 of each finger 36 is drilled and internally threaded for connection with the upper end 48 of one control rod 30. Each control rod 30 includes an elongated tubular cladding member 50 and an end plug 52 having the stabilizing configuration of the present invention attached to the lower end of the cladding member. The end plug 52 of the control rod 30 is solid and imperforate to coolant flow through the end plug and into the cladding member 50. In some control rod designs, a plurality of pellets of neutron absorbing material are arranged in an end-to-end stack within the cladding member 50. In other control rod designs, the pellets are of a material which does not absorb neutrons (water displacer rods) and the control of the reactor is achieved by the displacement of the water moderator as described in the above-mentioned U.S. Pat. No. 4,432,934.

Figure 5:
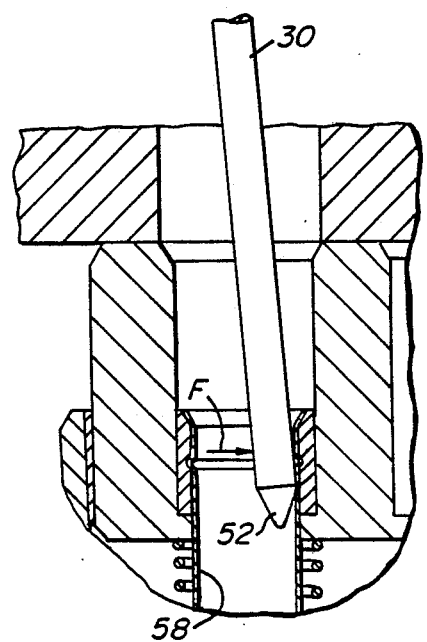
FIG. 5 is an enlarged, fragmentary view, partly in section, of an upper end of one of the guide thimbles and of one of the control rods in its withdrawn position extending a short distance into the thimble and having on its lower end an end plug with the stabilizing configuration depicted in FIG. 4 which creates a lateral force pressing the control rod against the wall of the thimble in accordance with the principles of the present invention.

As mentioned earlier, the power level of the reactor is usually regulated by the insertion and withdrawal of the control rods 30 into and from the guide thimbles 18. The control rods 30 are fully inserted during reactor shutdown, and some are withdrawn when the reactor is operating at full power. However, even in their withdrawn positions such as seen in FIG. 5, the control rods 30 still extend into the upper ends of the guide thimbles 18 a short distance, such as six inches or so. When the control rods 30 are fully inserted into the guide thimbles 18, and thus within the reactor core (not shown), they will generate heat.

Provision is made for cooling the control rods to prevent the pellets therein from melting. Typically, the lower portions of the guide thimbles have openings (not shown) whereby some of the pumped coolant entering the bottom of the fuel assembly 10 is diverted into the thimbles 18 and flows upwardly therein over the control rods 30. As previously mentioned, particularly when the control rods 30 are in their withdrawn positions the flow of water upwardly through the thimbles 18 past the partially inserted control rods induces vibratory motion in the lower ends of the rods which, absent the stabilizing configuration of the present invention, produces vibratory contact of their end plugs 52 with the internal walls 58 of the thimbles 18.

Control Rod End Plug With Stabilizing Configuration

Referring now to FIGS. 4 and 6 to 8, there is shown a variety of different stabilizing configurations or shapes of a control rod end plug which interact with the coolant to cause it to flow at non-symmetric velocities past the end plug. Such different shapes are all designed to produce generally similar non-symmetric flow velocity patterns which impose a lateral steady-state force against the control rod at its end plug that reduces vibratory motion and contact of the control rods with the internal walls 58 of the respective guide thimbles 18. Instead, the force F presses or biases the control rod 30 against the internal wall 58 of the thimble 18, as seen in FIG. 5.

As mentioned above, several asymmetric end plug designs can be used to achieve a desired pattern of non-symmetric coolant flow velocities around the tip of the end plug. These alternate designs will now be described.

FIG. 4 depicts a first asymmetric design of the end plug 52. The end plug 52 has the normal, generally conical or tapered outer surface 60, except for a flat 62 formed, such as by machining, on one side of the otherwise axially symmetrical outer surface. The original profile of the surface which the flat 62 replaces is shown in broken line form in FIG. 4. The flat 62 begins in the cylindrical body 64 of the end plug 52 adjacent the beginning of the lower tip 66 and extends down the tip 66, crossing the central axis 68 of the end plug 52 and forming a terminal end 70 on the opposite side of the axis 68. FIGS. 4a to 4c provide comparative cross sectional views of the end plug 52 which allow one to form a more complete three-dimensional mental image of the stabilizing configuration of the end plug. The end plugs 52 of FIGS. 3 and 5 have the stabilizing configuration of FIG. 4.

FIG. 6 illustrates a second asymmetrical design of an end plug 72 wherein a pair of flats 74,76 are formed on opposite edges of the tapered outer surface 78. Again, the original configuration of the lower tip 80 of the plug 72 is shown in broken line form. The left flat 74 is substantially identical to the flat 62 of the FIG. 4 design in that it crosses the axis 82 with the other flat 76 on the opposite side of the axis. The right flat 76 begins higher on the end plug cylindrical body 86 than the left flat 74 and thus forms a shallower angle with the axis 82 than the angle formed therewith by the left flat 74. Again, FIGS. 6a to 6c provide a sequence of cross sectional views of the end plug 72 which enhances one's ability to form a three-dimensional image of the plug.

FIG. 7 represents a third asymmetrical design of an end plug 88 wherein the original symmetrically tapered configuration of the plug tip, as shown in dash line form, has been reduced down, such as by machining, into a tip 90 having a steeper and more pointed conical configuration. The tip 90 has an axis 92 which intersects the central axis 94 of the end plug 88 and forms a terminal end 96 offset to one side of the axis 94. The cross sectional views in FIGS. 7a to 7c clearly depict the conical form of the tip 90.

Finally, FIG. 8 illustrates a fourth asymmetrical design of an end plug 98 having a concave surface 100 formed on a side of the tapered outer surface 102 of the plug. The concave surface 100 begins in the cylindrical body 104, crosses the central axis 106 of the end plug 98 and forms a lower terminal end 108 on the tip 110 on the opposite side of the axis 106. A clear understanding of the three-dimensional configuration of the end plug 88 may be gained from a review of the cross sectional sequence of views in FIGS. 8a to 8c.

A common feature of each of these asymmetrical tip designs of FIGS. 4 and 6 to 8 is that the terminal tip ends 70, 84, 96 and 108 thereof are all offset to the right of the respective central axes 68, 82, 94 and 106 of the end plugs 52, 72, 88 and 98. This ensures that the lateral force imposed on each of the end plugs by the non-symmetric coolant flow velocity patterns is imparted from the left side of the axis. Also, each of the asymmetrical end plug shapes reduces the possibility of flow-induced vibration such as caused by vortex shedding in the symmetrical designs heretofore. Thus, all of the asymmetrical end plug stabilizing configurations perform the same functions in an advantageous manner; however, some of the geometric arrangements may be more suitable from a manufacturing standpoint than others.

It is thought that the end plug stabilizing configurations of the present invention and many of their attendant advantages will be understood from the foregoing description and it will be apparent that various changes may be made in the form, construction and arrangement thereof without departing from the spirit and scope of the invention or sacrificing all of their material advantages, the forms hereinbefore described being merely a preferred or exemplary embodiments thereof.

We claim:

1. In a nuclear reactor including at least one guide thimble and at least one control rod received in said guide thimble and supported for movement relative thereto, the improvement which comprises:

an end plug having a central axis and an imperforate asymmetrical tip configuration attached to an end of said control rod, said asymmetrical tip configuration defining a lower terminal end on said end plug which is offset to one side of said central axis and produces, in response to axial flow of coolant along said control rod and within its respective guide thimble, a non-symmetric coolant flow velocity pattern about said end plug and a lateral substantially steady state force on said control rod which presses said control rod end plug against a wall of said guide thimble so as to substantially prevent lateral vibration of said control rod due to said axial flow of the coolant.

2. The nuclear reactor as recited in claim 1, wherein said asymmetrical tip configuration includes a flat formed on a side of a generally tapered outer surface of said end plug tip so as to begin at an upper portion of said end plug on an opposite end of said central axis, intersect said central axis and terminate at said lower terminal end on said one side of said central axis.

3. The nuclear reactor as recited in claim 1, wherein said asymmetrical tip configuration includes a pair of flats formed on opposite sides of a generally tapered outer surface of said end plug, one of said flats intersecting said central axis of said end plug and meeting said other of said flats at said lower terminal end on said one side of said central axis.

4. The nuclear reactor as recited in claim 1, wherein said asymmetrical tip configuration includes a pointed conical surface which terminates at said offset lower terminal end of said end plug.

5. The nuclear reactor as recited in claim 1, wherein said asymmetrical tip configuration includes a concave surface formed on a side of a generally tapered outer surface of said end plug so as to begin at an upper portion of said end plug on an opposite side of said central axis, intersect said central axis and terminate at said lower terminal end on said one side of said central axis.

* * * * *